Nov. 14, 1950  F. MASSA  2,529,658
TRANSDUCER AND SYSTEM
Filed Jan. 31, 1944  6 Sheets-Sheet 1

INVENTOR.
FRANK MASSA
BY
Elmer J. Hyde
ATTORNEY

Nov. 14, 1950  F. MASSA  2,529,658
TRANSDUCER AND SYSTEM
Filed Jan. 31, 1944  6 Sheets-Sheet 2

INVENTOR.
FRANK MASSA
BY
Eber J. Hyde
ATTORNEY

Nov. 14, 1950  F. MASSA  2,529,658
TRANSDUCER AND SYSTEM
Filed Jan. 31, 1944  6 Sheets-Sheet 3
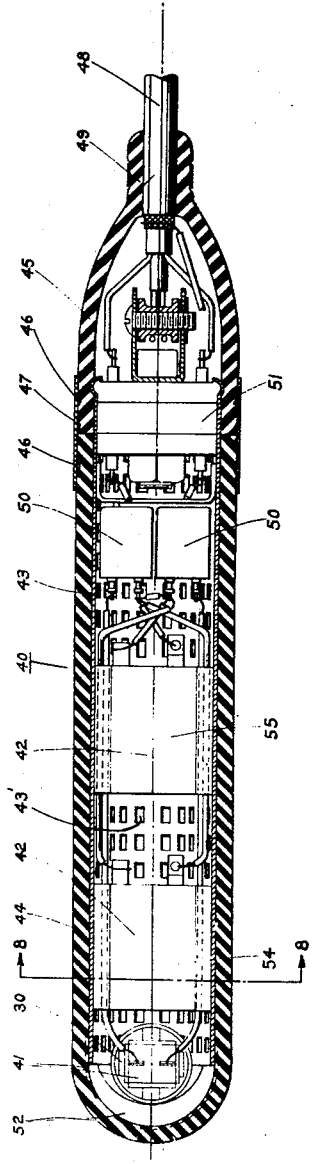
INVENTOR.
FRANK MASSA
BY
Eber J. Hyde
ATTORNEY Nov. 14, 1950  F. MASSA  2,529,658
TRANSDUCER AND SYSTEM
Filed Jan. 31, 1944  6 Sheets-Sheet 4
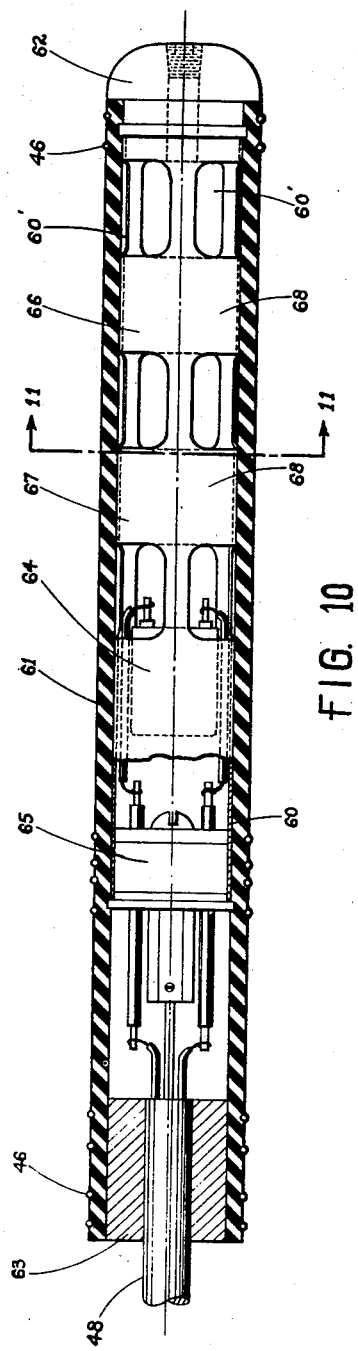
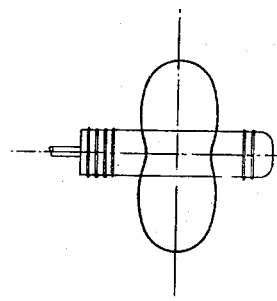
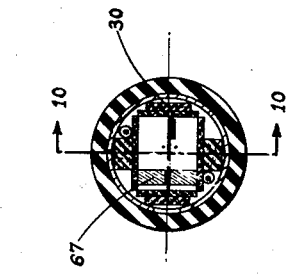
INVENTOR.
FRANK MASSA
BY
ATTORNEY Nov. 14, 1950
F. MASSA
2,529,658
TRANSDUCER AND SYSTEM
Filed Jan. 31, 1944
6 Sheets-Sheet 5
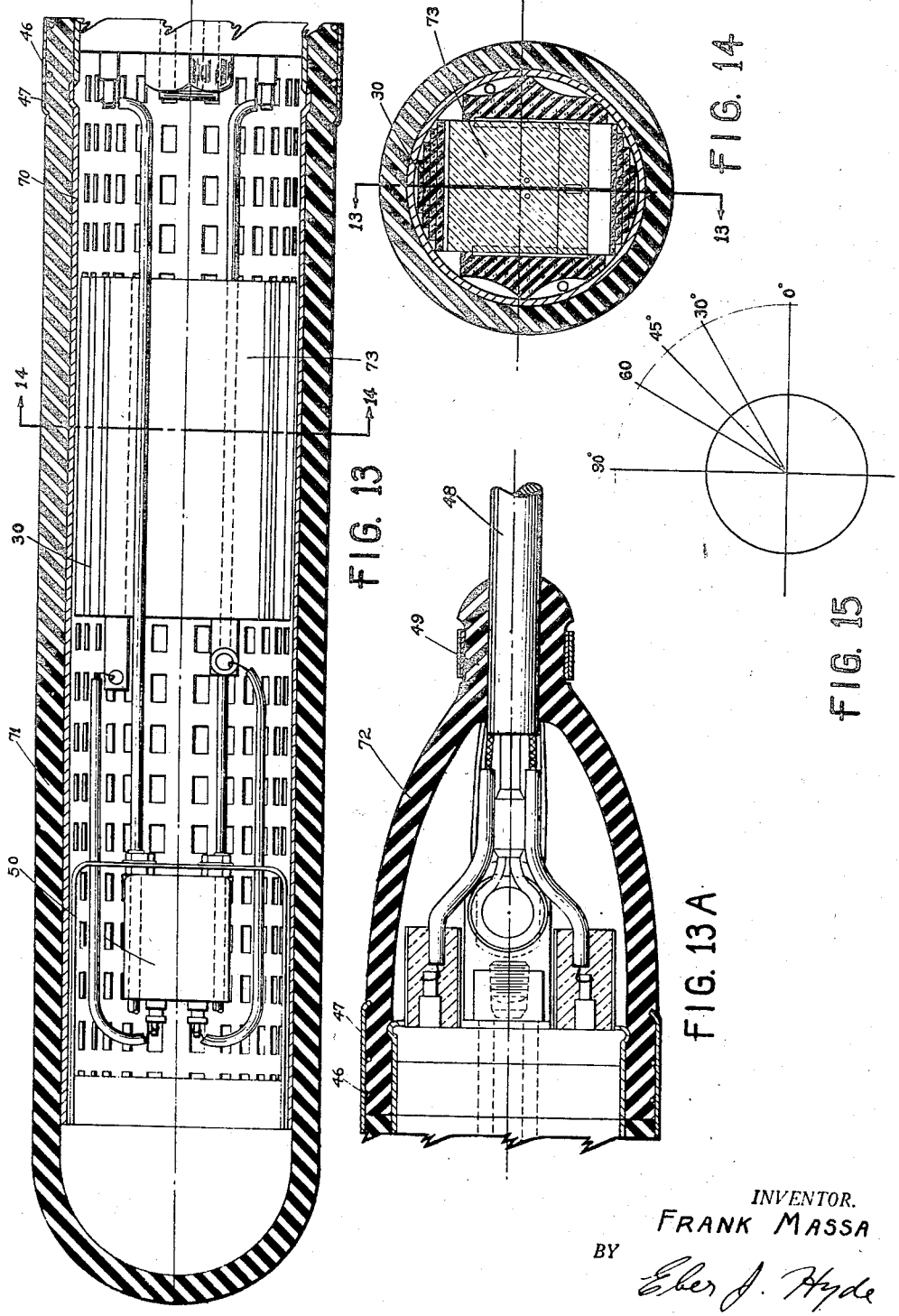
INVENTOR.
FRANK MASSA
BY
Eber J. Hyde
ATTORNEY Nov. 14, 1950

F. MASSA 2,529,658

TRANSDUCER AND SYSTEM

Filed Jan. 31, 1944

INVENTOR.
FRANK MASSA
BY
Eber J. Hyde
ATTORNEY

Patented Nov. 14, 1950

2,529,658

UNITED STATES PATENT OFFICE 2,529,658

TRANSDUCER AND SYSTEM

Frank Massa, Cleveland Heights, Ohio, assignor to The Brush Development Company, Cleveland, Ohio, a corporation of Ohio Application January 31, 1944, Serial No. 520,568

1 Claim. (Cl. 177—386)

My invention pertains to transducers and more particularly to one or more transducers having two or more distinct directional patterns which intersect each other.

In the art of loudspeaker and microphone transducers for operation in air or water it is well known to so construct them that they have a directional pattern.

My invention pertains to utilizing a combination of two or more individual transducers.

Each transducer has its own separate directional pattern, and two or more transducers are so positioned with respect to each other and so electrically connected together that their separate directional patterns intersect each other to form a small zone or area within which at least two transducers have substantially equal response. To one side of this zone of equal response the first of the transducers is more sensitive than the second, and to the other side of this area the second transducer is more sensitive than the first. If, for instance, the transducer is serving as a microphone and there is a sound source to the one side of the zone of equal response the response of the first transducer will exceed the response of the second transducer and the electrical circuit connected to the first transducer may be utilized to exercise a holding operation. If, however, the sound source is to the other side of the zone of equal response the response of the second transducer will exceed the response of the first transducer and the electrical circuit connected thereto may be utilized to operate a release of the holding operation or to initiate a sequence of events. For example: An underwater mine may be equipped with a device embodying my invention and positioned in relatively shallow water. If a boat is moving in the locality of this mine but outside of its range of effectiveness, one transducer will be utilized to keep the mine from firing. However, if this boat should move within the range of the effectiveness of this mine, the second transducer would be utilized to cause the mine to fire. This system is very effective because the firing of the mine is independent of the intensity of vibration sent out by the sound source and is solely dependent upon the position of the sound source with respect to the zone of substantially equal response.

It is therefore an object of my invention to provide a device and system for operating in the foregoing manner.

Another object of my invention is to provide a transducer system for initiating an operation in accordance with the angular position of a sound source with respect to the transducers.

Another object of my invention is to provide a transducer and transducer system whose operation is relatively independent of sound intensity.

A still further object of my invention is to provide a transducer of simple, low cost construction and yet maintain high resistance to mechanical shocks or explosions.

A further object of my invention is to combine in a single housing two transducers having two intersecting directional patterns.

Other objects and a fuller understanding of my invention may be had by referring to the following description and claim taken in conjunction with the drawings, in which:

Figure 6 is a diaphragm showing in plan view the two directional patterns of the two transducers.

Figure 7 is a sectional view showing another type of housing which has two transducers within it.

Figure 8 is a sectional view taken along line 8—8 in Figure 7.

Figure 9 shows the directional pattern of the two transducers shown in Figure 7.

Figure 10 is a sectional view taken along line 10—10 of Figure 11, showing a housing which has one transducer comprised of two crystal units within it.

Figure 11 is a sectional view taken along line 11—11 of Figure 10, and

Figure 12 shows the directional pattern of the transducer illustrated in Figure 10.

Figures 13 and 13—A are sectional views taken along lines 13—13 of Figure 14, showing another transducer having a directional pattern as illustrated in Figure 15, and Figure 14 is a sectional view taken along line 14—14 of Figure 13.

Figure 15 is a directional pattern.

Figure 16:
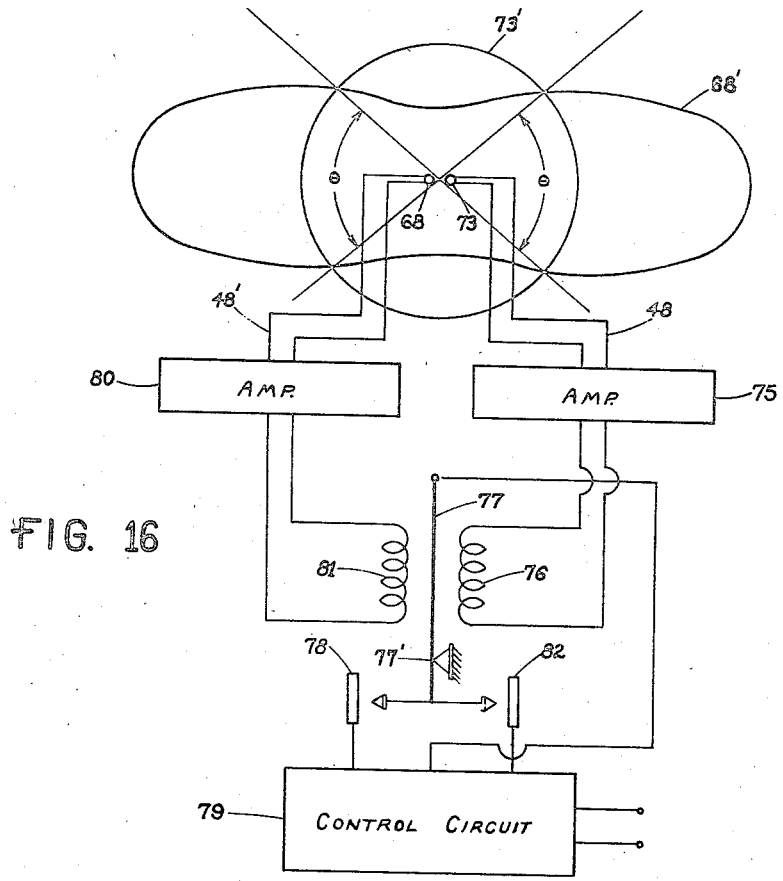
Figure 17:
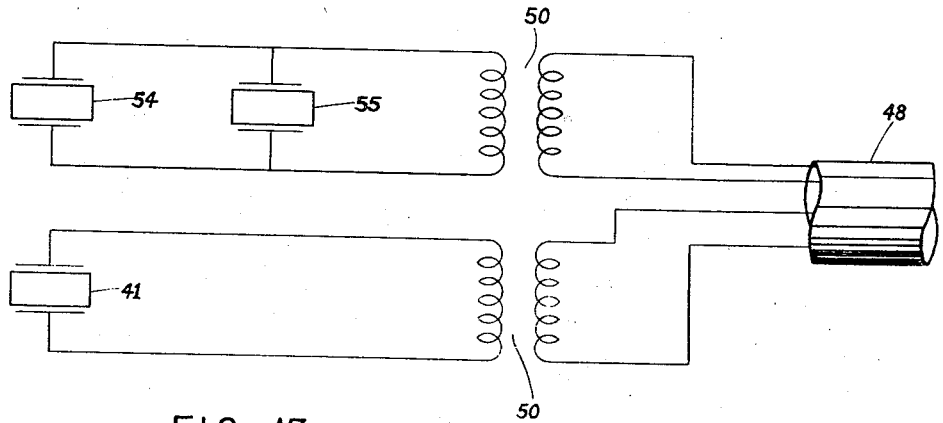

Figure 16 shows the relationship of the directional patterns which are illustrated in Figures 12 and 15 when transducers, such as are exhibited in Figures 10 and 13, are mounted close together, and showing an associated trigger circuit for initiating an operation, and Figure 17 is a schematic drawing illustrating the relationship of a directional transducer and a non-directional transducer.

Figure 1:
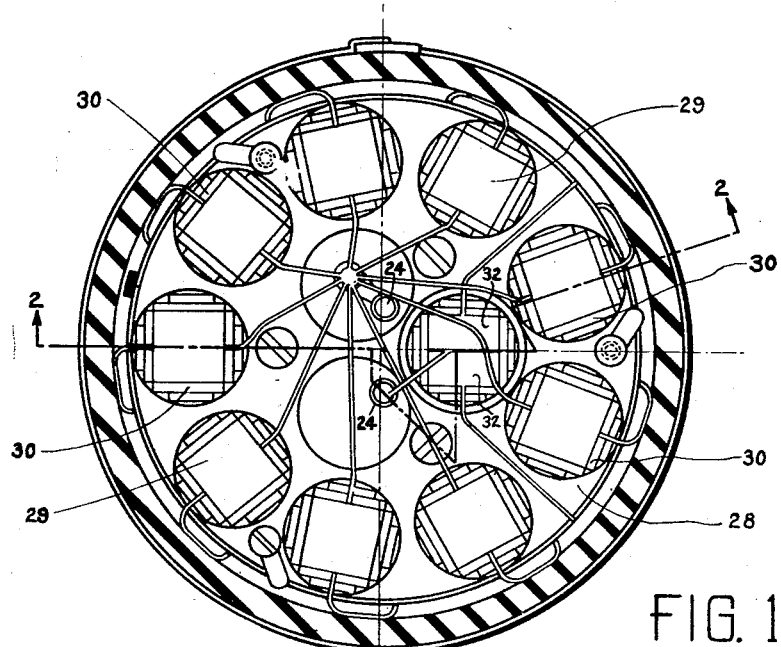
Figure 1 is a sectional view taken through line 1—1 of Figure 2 and showing a transducer housing enclosing two transducers.
Figure 2:
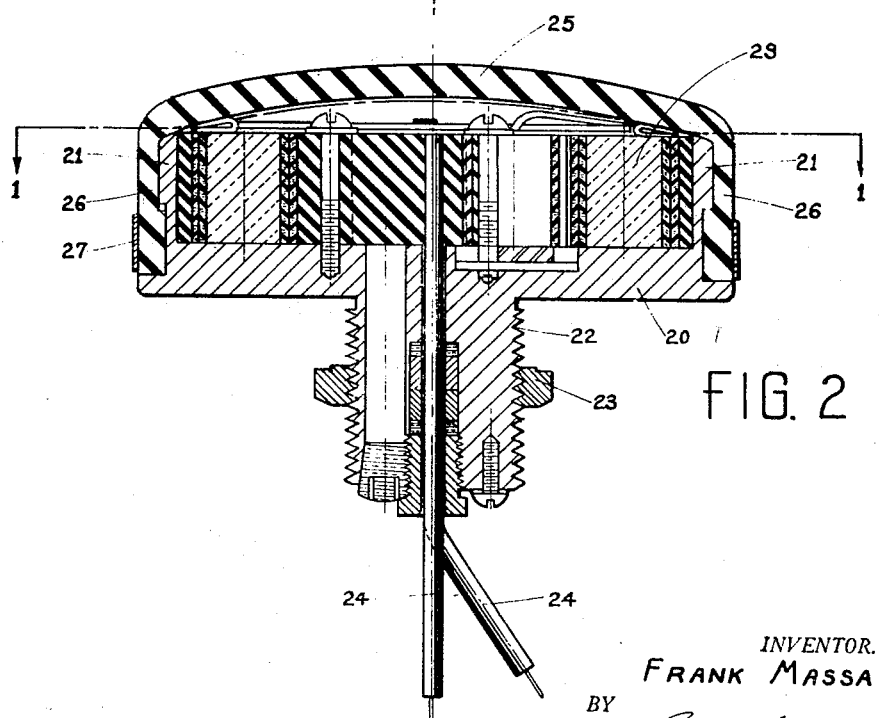
Figure 2 is a sectional view taken along line 2—2 of Figure 1.
Figure 3:
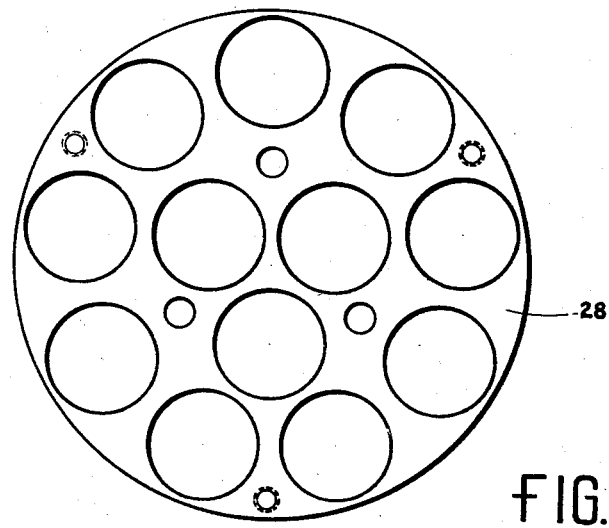
Figure 3 is a plan view of the crystal retaining ring of Figures 1 and 2.

With reference to Figures 1 and 2, I show a transducer which comprises a housing 20 having a base portion and upstanding edge portions 21. Integral with the base portion 20 is a threaded mounting member 22 having a large nut 23 for mounting the transducer upon a plate and for providing a moisture-proof seal where the wires 24 enter the housing 20. A rubber cap 25 having a downwardly turned edge portion 26 is connected to the housing 20 and to the edge portion 21 of the housing by means of a metal band 27.

Figure 4:
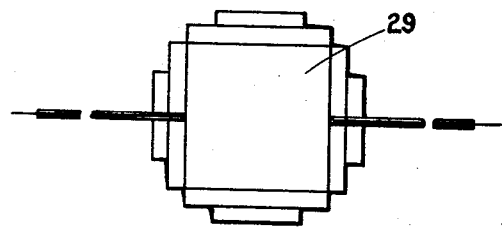
Figure 4 is a plan view showing a type of crystal used in one of the transducers in the housing.
Figure 5:
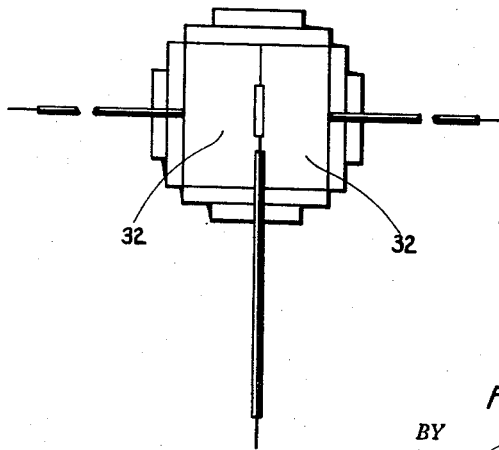
Figure 5 is a plan view of a crystal assembly which is used for the other transducer in the housing.

Within the enclosure defined by the housing 20 and the rubber cap 25 there is a crystal retaining member 28 which may be made of a molded high impact resistant plastic or other such hard insulating means which is impervious to oil. This retainer is positioned against the base of the housing 20 and has a plurality of holes arranged in a circle about its center. In each of these holes there is positioned a piezoelectric crystal 29 which is shown in detail in Figure 4. Soft sound isolation mounting means, such as a molded composition of cork and rubber known as Corprene strips 30 are utilized for holding the crystals 29 in the holes in the retainer 28 and to prevent sound transmission to certain portions of the crystal surface. These crystals 29 are electrically connected in parallel and to an amplifier (not shown) and have a directional pattern indicated by the reference character 33 shown in Figure 6. The crystal retainer 28 has another hole positioned within the ring of crystals 29 and a pair of crystal plates 32 are positioned within that hole and are held there by Corprene strips 30. The crystal comprises a second transducer within the housing 20 and has a directional pattern as shown by reference character 31 in Figure 6. This second transducer is connected to a second amplifier (not shown) and is independent of the transducer which is comprised of the ring of crystals 29. As has been explained in my previous application Serial No. 436,304, now abandoned which was divided into applications Serial No. 519,069 (Patent No. 2,497,680) and Serial No. 669,761 (Patent No. 2,456,294) the air inside of the housing 20 is evacuated and replaced by oil so that the crystals operate by transmission of vibration through the oil and through the rubber cap 25. The crystals may be Rochelle salt or the like, or they may be ammonium dihydrogen phosphate or the like.

The two transducers 29 and 32 which are mounted within the single housing 20 have two independent directional patterns such as are shown by reference characters 33 and 31 of Figure 6. These two directional patterns intersect each other and lines drawn from the location of the transducers 29 and 32 to the points where the directional patterns intersect each other define a cone having an apex angle θ located at the transducers 29 and 32. If a sound source is positioned outside of this angle θ, the transducer 32 which has a directional pattern identified by reference character 31 is more sensitive than the transducer 29 having a directional pattern identified by reference character 33. Therefore, the amplifier connected to the transducer 32 can be made to exercise an action such, for example, as positively preventing an underwater mine from firing. If the sound source which was outside of the angle θ moves within the angle θ, then transducer 29 is more sensitive than transducer 32 and the amplifier which is connected to the transducer 29 can be made to fire the underwater mine. This means that the firing of the mine is in accordance with the position of the sound source with respect to the directional patterns of the transducers 29 and 32, and is entirely independent of the intensity of the sound source. If it is desired to change the angle θ, it may be done by adjusting the gain of either one or both of the amplifiers which are connected to the transducers 29 and 32 thereby altering the location where their sensitivity is equal. This will change the angle θ making it narrower or broader.

If a mine is planted in shallow water and it has a transducer system such as has been described, it may be advantageous to have θ large, and if a mine is placed in relatively deep water it may be advantageous to have the angle θ narrow. In either case the mine can be prevented from firing until the sound source is within effective range and the instant the sound sources comes within effective range the mine can be exploded.

My description is made with reference to underwater mines. However, it is to be understood that my invention is not limited to underwater operation. In fact a wide variety of operations either in air or water may be controlled by my invention.

Figure 7 illustrates a housing indicated generally by the reference character 40 which encloses two transducers 41 and 42, the transducer 42 being comprised of two piezoelectric crystal units 54, 55. The housing 40 is comprised of a steel shell 43 having a number of openings 43' therethrough and first and second thick rubber sleeves 44 and 45 connected to the steel shell 43 by means of wires 46 and a steel band 47 to form a water-tight joint. Wires 48 are brought into the housing 40 through the water-tight seal 49. As in the other transducer housing, the air is evacuated and replaced by oil. Suitable transformers 50 are provided, and a water-tight seal 51 is made between the transformer end and the lead end of the housing. A transducer 41 is mounted in the end of the housing 40 and is protected by a steel crash-cap 52. The transducer 41 is comprised of one or more piezoelectric crystals which may be of the 45° X-cut expander type of Rochelle salt or any other suitable crystalline material such as ammonium dihydrogen phosphate, and has a directional pattern illustrated by the reference character 53 in Figure 9. As in Figures 1 and 2, the crystals in the transducer 41 may be protected and isolated by Corprene strips 30. The transducer 41 is connected to its own amplifier and the transducer 42, which is comprised of two crystals 54 and 55 is connected to its own separate amplifier. These crystals 54 and 55 are spaced apart a half wave length at the frequency at which the device is adapted to operate, and the two crystals are connected in parallel thereby establishing a directional pattern which is illustrated by the reference character 56 in Figure 9. The patterns 53 and 56 are actually surfaces of revolution about the hydrophone axis indicated in Figure 9. The angle θ then defines a toroidal zone within which a sound source will control an operation as has been described in detail in connection with Figures 1 and 2.

Figures 1, 2 and 7 each illustrate housings which contain two transducers. My invention may also be exercised by positioning two transducers, each within its own housing, close together; and having each transducer connected to its own amplifier. If one of the transducers has a directional pattern which differs from the other and if they are properly placed so that their directional patterns intersect each other, there will be established the aforedescribed angle $\theta$ which is the critical angle of operation of the device.

Figure 10 shows one such housing utilizing a single transducer having a directional pattern as shown in Figure 12, and Figures 13 and 13—A show another such housing utilizing a single transducer having a directional pattern as shown in Figure 15. If these two housings are under water and positioned close to each other so that their directional patterns will overlap as is shown in Figure 16, then the operation of the system can be made like the operation of the system shown in Figure 7.

In Figure 10, there is shown a steel housing 60 having a number of openings 60' therethrough and it is covered by a rubber sleeve 61. An end piece 62 is provided for closing and sealing one end of the rubber sleeve and the sleeve is connected to it by means of wires 46. The other end is sealed against the entrance of water by means of the plug 63 to which the rubber sleeve is connected by means of wires 46. Electrically conductive wires 48 are provided and they pass through the plug 63 in such a manner that no water is admitted. A transformer 64 is provided within the sleeve and a water-proof seal 65 is also provided. There are two crystal assemblies 66 and 67 within the housing which establish a single transducer 68 having a directional pattern such as is shown in Figure 12. These two crystal assemblies 66 and 67 are mounted in corprene strips 30 and are positioned one-half wave length apart at the frequency at which the device is adapted to operate.

In Figures 13 and 13—A there is shown a steel housing 70 having a number of holes through it and a rubber sleeve 71 covering a portion of it and a rubber end piece 72 covering another portion of it. These two sleeve portions 71 and 72 are connected to the steel housing 70 by means of wires 46 and a steel band 47 such as is shown in Figure 7. A transformer 50 is provided. The difference between the device shown in Figure 7 and Figure 13 is that the device shown in Figure 13 has only one crystal assembly 73. This crystal assembly is held in the tube by means of corprene strips 30 and the tube is oil-filled as in the other devices. Because there is only a single crystal assembly 73 the transducer will have a directional pattern as shown in Figure 15.

Figure 16 illustrates a system wherein transducer 68 and transducer 73, each in its own separate housing, are mounted near each other in such a manner that their directional patterns (identified by reference characters 68' and 73') intersect thereby establishing a toroidal zone having an angle $\theta$ similar to that shown in Figure 9. If the sound source is outside of the angle $\theta$ the transducer 73 is more sensitive to sound vibrations than the transducer 68, therefore electrical signals applied through wires 48 to the amplifier 75 are stronger than the signals applied by the transducer 68 to the amplifier 80, and the current through coil 76 is greater than the current through coil 81. One end of the lever 77 will be attracted to the coil 76 due to the greater current in the coil 76, thereby causing the lever to pivot about point 77' to make a circuit through the switch 78 for exercising a holding action on the control circuit 79. If, however, the sound source moves within the zone defined by the angle $\theta$, the transducer 68 becomes the more sensitive of the two and a signal in the wires 48' which is amplified by amplifier 80, is greater than the signal to amplifier 75. This causes the current in coil 81 to be greater than the current in coil 76 thereby moving the lever 77 about pivot point 77' to establish a circuit through switch 82. By this action the previous holding action in the control circuit is overridden, and the control circuit may fire a mine or may initiate any other such action.

While Figure 16 shows two separate transducer housings it is to be understood that the circuit arrangement and operation may be utilized with two transducers within a single housing, such as is shown in Figures 1 and 7.

Figure 17 shows how the crystals of the devices shown in Figures 1 and 7 may be connected. The directional pattern is established by the crystals 54, 55 which are connected in parallel and the non-directional pattern is established by the single crystal 41. Any number of crystals such as 54 and 55 can be connected in parallel such as the plurality of crystals shown in Figure 1, and through the transformer 50 to the lead wires 48 and any number of crystals can be connected as a group instead of utilizing a single crystal 41.

Although I have described my invention as exercising a holding action when a sound source is outside of angle $\theta$ and as initiating a firing action when the sound source moves within the angle $\theta$, it is understood that these actions could be reversed if it is so desired to cause the firing action to take place when a sound source is outside of angle $\theta$ and a holding action to be exercised when the sound source is within the angle $\theta$.

Throughout this description I have referred to one transducer being more sensitive within a certain zone than another transducer, and to the transducers having different sensitivity patterns. It is to be undertsood that within the scope of this invention it is possible to utilize two similar transducers having similar directional patterns and to so place them with respect to each other that their patterns intersect to form an angle or zone $\theta$; and it is possible to adjust the gain of the amplifiers which are connected to the transducers to cause a first transducer system (comprised of a transducer and an amplifier) to be more sensitive than the other transducer system, even though the transducer of the first system is less sensitive than the transducer of the other system.

Although I have described my invention with a certain degree of particularity it is to be understood that numerous advantages can be met without departing from the spirit and scope of my invention.

I claim as my invention:

In a system for controlling the initiation of an event; a first microphone having a first sensitivity pattern; a second microphone having a second sensitivity pattern; means connecting said two microphones together closely adjacent each other with their sensitivity patterns overlapping and immovable with respect to each other thereby defining in space a first zone where the first microphone is more sensitive than the second microphone and a second zone where the second microphone is more sensitive than the first microphone; and a differential switch device having two spaced apart coils one of which is connected to said first microphone and the other of which is connected to said second microphone, only a single armature movably mounted between said two coils to be differentially acted upon by the two fields set up by said two coils and carrying two contacts; control circuit means; and two spaced apart contacts connected to said control circuit means and positioned to be engaged one by one contact on said movable armature and the other by the other contact on said movable armature in accordance with the position of said armature due to the resultant force of said two fields.

FRANK MASSA.

REFERENCES CITED

The following references are of record in the file of this patent:

UNITED STATES PATENTS

| Number | Name | Date |
|---|---|---|
| Re. 21,607 | Williams | Oct. 22, 1940 |
| 1,137,222 | Leon | Apr. 27, 1915 |
| 1,344,352 | Parmele et al. | June 22, 1920 |
| 2,109,475 | Fanning | Mar. 1, 1938 |
| 2,138,036 | Kunze | Nov. 29, 1938 |
| 2,138,966 | Hafner | Dec. 6, 1938 |
| 2,166,991 | Guanella | July 25, 1939 |
| 2,173,219 | Anderson | Sept. 19, 1939 |
| 2,181,132 | Kallmeyer | Nov. 28, 1939 |
| 2,184,247 | Baumzweiger | Dec. 19, 1939 |
| 2,266,038 | Hinman | Dec. 16, 1941 |
| 2,331,236 | Schaefer | Oct. 5, 1943 |
| 2,339,291 | Paulus et al. | Jan. 18, 1944 |
| 2,349,370 | Orner | May 23, 1944 |
| 2,417,927 | Giannini | Mar. 25, 1947 |
| 2,422,446 | Stuart, Jr. | June 17, 1947 |

FOREIGN PATENTS

| Number | Country | Date |
|---|---|---|
| 297,977 | Germany | Jan. 19, 1920 |
| 344,967 | Great Britain | Mar. 19, 1931 |
| 482,717 | Great Britain | Apr. 1, 1938 |